United States Patent
Tsirkin (10) Patent No.: US 9,280,380 B2
(45) Date of Patent: Mar. 8, 2016

(54) MANAGEMENT OF I/O REQEUSTS IN VIRTUAL MACHINE MIGRATION

(75) Inventor: Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 263 days.

(21) Appl. No.: 13/407,941

(22) Filed: Feb. 29, 2012

(65) Prior Publication Data

US 2013/0227559 A1  Aug. 29, 2013

(51) Int. Cl.
*G06F 9/46* (2006.01)
*G06F 9/455* (2006.01)

(52) U.S. Cl.
CPC .... *G06F 9/45558* (2013.01); *G06F 2009/4557* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 7,111,086 B1* | 9/2006 | Ecoleston et al. | 710/33 |
| 7,512,769 B1* | 3/2009 | Lowell et al. | 711/203 |
| 8,769,102 B1* | 7/2014 | Zhou et al. | 709/226 |
| 8,903,888 B1* | 12/2014 | Hyser et al. | 709/202 |
| 2002/0026484 A1* | 2/2002 | Smith | H04L 51/28 709/206 |
| 2007/0204265 A1* | 8/2007 | Oshins | 718/1 |
| 2009/0249366 A1* | 10/2009 | Sen et al. | 719/327 |
| 2009/0265706 A1* | 10/2009 | Golosovker et al. | 718/1 |
| 2010/0262586 A1* | 10/2010 | Rosikiewicz et al. | 707/679 |
| 2010/0299666 A1* | 11/2010 | Agbaria | G06F 9/4856 718/1 |
| 2010/0318991 A1* | 12/2010 | Venkitachalam et al. | 718/1 |
| 2010/0325282 A1* | 12/2010 | Oshins | 709/226 |
| 2011/0239215 A1* | 9/2011 | Sugai | 718/1 |
| 2011/0246986 A1* | 10/2011 | Nicholas et al. | 718/1 |
| 2012/0042034 A1* | 2/2012 | Goggin et al. | 709/216 |
| 2012/0054408 A1* | 3/2012 | Dong et al. | 711/6 |
| 2012/0137098 A1* | 5/2012 | Wang et al. | 711/165 |
| 2012/0324443 A1* | 12/2012 | Low et al. | 718/1 |
| 2013/0081013 A1* | 3/2013 | Plondke et al. | 718/1 |
| 2013/0151705 A1* | 6/2013 | Menon et al. | 709/226 |
| 2013/0212578 A1* | 8/2013 | Garg et al. | 718/1 |
| 2014/0165063 A1* | 6/2014 | Shiva et al. | 718/1 |

* cited by examiner

Primary Examiner — Adam Lee
(74) Attorney, Agent, or Firm — Lowenstein Sandler LLP (57) ABSTRACT

Management of input/output (I/O) requests in virtual machine (VM) migration is provided. More specifically, tracking of I/O requests associated with a VM selected for migration from an origin host machine to a destination host machine may be provided. A data record providing a listing of tracked I/O requests may be generated and stored. When a determination is made that a migrated VM is ready for operation at the destination host machine, processing of I/O requests associated with the migrated VM may be canceled on the origin host machine. The stored data record providing the listing of tracked I/O requests may then be retrieved when the migrated VM is resumed at the destination host machine to determine the completion status of the I/O requests canceled on the origin host machine and complete processing of the same on the destination host machine.

16 Claims, 4 Drawing Sheets

MANAGEMENT OF I/O REQEUSTS IN VIRTUAL MACHINE MIGRATION

TECHNICAL FIELD

Embodiments of the invention relate generally to virtual machine systems and, more specifically, to managing input/output requests in virtual machine migration.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices.

Often times, a VM that is centrally hosted may require migration for a variety of reasons, including load balancing on the host server, maintenance of the host server, upgrades of software and/or hardware of the host server, and so on. Presently, solutions are offered for migration of VMs. Yet, a problem that arises with current implementations of VM migration is that they typically wait for input/output (I/O) requests associated with a migrating VM to be completed on its corresponding origin host machine before its operations can be resumed on a destination host machine.

Under these current implementations, completion of the migration process for a VM may be unnecessarily delayed and processing resources on the corresponding originating host machine may be inefficiently utilized, thereby resulting in performance degradation of the origin host machine.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Embodiments of the invention provide methods for handling the processing of input and output (I/O) requests during migration of virtual machines (VMs). I/O requests may be processed at an origin host machine as a VM is prepared for migration to a destination host machine. When a VM undergoing migration is ready to be resumed for operation at the destination host machine, processing of pending I/O requests associated with the VM may be canceled at the origin host machine and restarted at the destination host machine. By permitting the cancellation of pending I/O requests at the origin host machine and resuming their processing at the destination host machine, the migrated VM may resume operations without having to wait for all pending I/O requests to be processed at the origin host machine, thereby minimizing a processing load on the origin host machine.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "identifying", "receiving", "requesting", "copying", "tracking", "saving", "retrieving", "determining", "canceling", "passing", "processing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Figure 1:
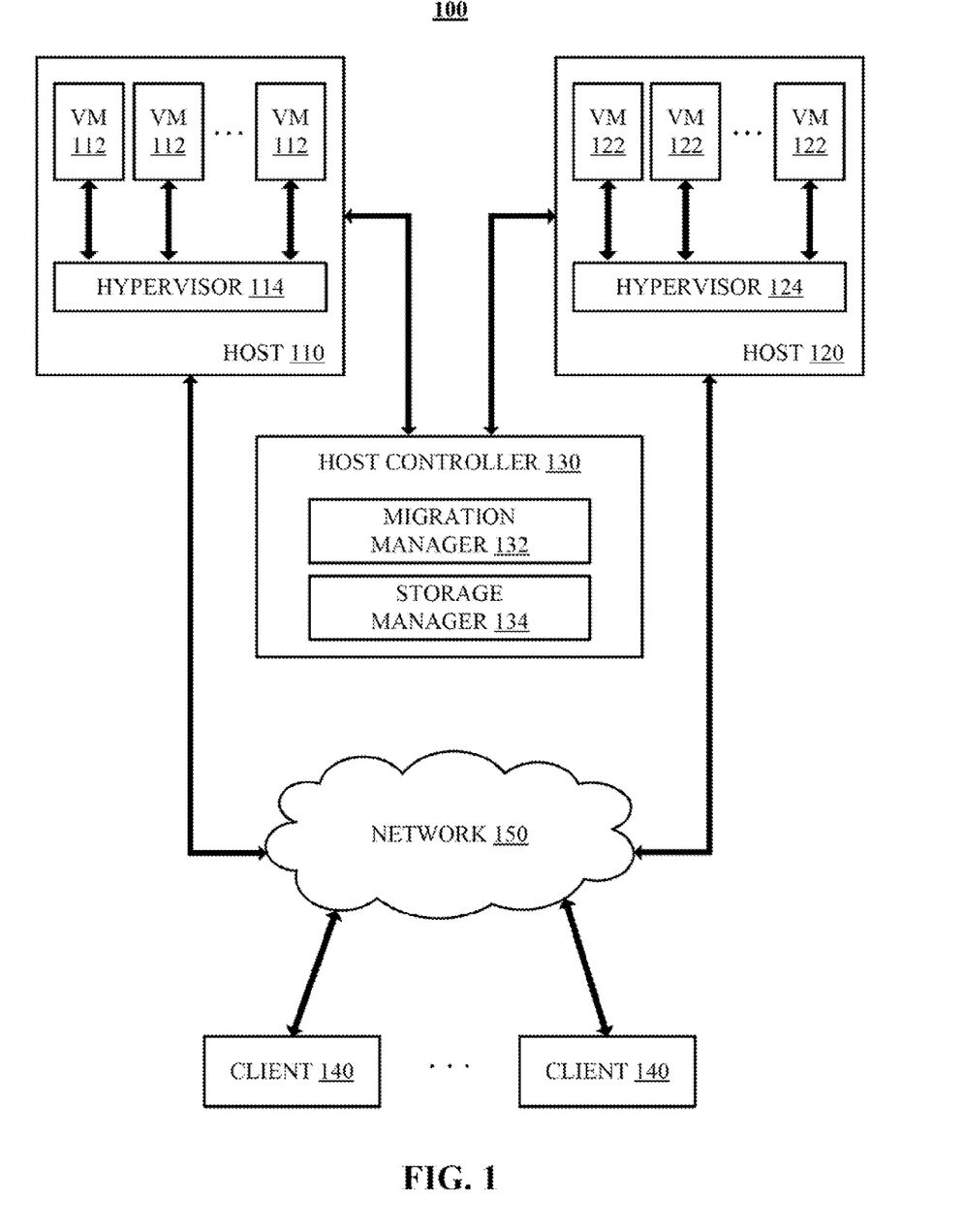
FIG. 1 is a block diagram illustrating an exemplary virtualization architecture in which embodiments of the present invention may operate.

FIG. 1 is a block diagram illustrating an exemplary virtualization architecture 100 in which embodiments of the present invention may operate. Referring to FIG. 1, virtualization architecture 100 may include one or more host machines 110, 120 to run one or more virtual machines (VMs) 112, 122. Each of VMs 112, 122 runs a guest operating system (OS) that may be different from one another. The guest OS may include Microsoft Windows, Linux, Solaris, Mac OS, etc. Host machines 110, 120 may include a hypervisors 114, 124 that emulate the underlying hardware platform for VMs 112, 122. Hypervisors 114, 124 may also be known as a virtual machine monitor (VMM), a kernel-based hypervisor or a host operating system.

In one embodiment, each of VMs 112, 122 may be accessed by one or more clients 140 over a network 150. Network 150 may be a private network (e.g., a local area network (LAN), wide area network (WAN), intranet, etc.) or a public network (e.g., the Internet). In some embodiments, clients 140 may be hosted directly by host machines 110, 120 as a local client. In one scenario, VMs 112, 122 provide a virtual desktop for the client.

As illustrated, host machines 110, 120 may be coupled to a host controller 130 (via a network or directly). In some embodiments, host controller 130 may reside on a designated computer system (e.g., a server computer, a desktop computer, etc.) or be part of host machines 110, 120 or another machine. VMs 112, 122 residing on host machines 110, 120 can be managed by host controller 130, which may add a VM, delete a VM, balance the load on the server cluster, provide directory service to the, and perform other management functions.

In one embodiment, host controller 130 may include a VM migration manager 132 configured to determine which of host machines 110, 120 to place a VM 112, 122 selected for migration. In a virtualization system it is important to schedule (also referred to as selection or placement) VMs on the "best host" for the job. There are various considerations for selecting the "best host". In one embodiment, migration manager 132 may be configured to employ a selection algorithm that considers a variety of factors for placement of a VM. Factors that may be considered in determining a preference given to a candidate host may be, for example, overhead of access to resources used by the VM (such as networking storage), load placed on the host by other VMs, closeness of the host to allowed temperature envelope boundaries, location of other VMs that are able to perform functional failover or load-balancing with the VM or a combination thereof.

In one embodiment, the selection algorithm includes a process that scans for relevant host machines 110, 120 that can launch a VM and provide all relevant resources for the VM, such as access to relevant storage and logical networks. Host machines 110, 120 that satisfy these requirements are known as candidate hosts. The selection algorithm may also include checks against exclusion criteria, which are a set of requirements that would not allow the VM to run on a certain host, thus removing that host from the list of candidate hosts for selection. The selection algorithm may also include comparison ordering to sort the remaining candidate hosts by means of a score (or any other type of transitive order) that will identify the best host. In one embodiment, the score may be a numeric representation of the preference given to a candidate host for selection by the algorithm, where a higher score is equivalent to a higher preference and the candidate with the highest score is selected for the placement.

In one embodiment, host controller 130 may also include a storage manager 134 configured to manage data storage for one or more VMs 112, 122. Data storage may be available in the form of a single or a plurality of storage devices (not shown). In one embodiment, storage devices may be designated for individual VMs 112, 122, which may be independent storage devices or a designated area of a single storage device. Storage manager 134 may be configured to manage multiple, independent storage devices in dispersed locations.

To initiate the migration process, host controller 130 may monitor virtualization system 100 to identify when VMs 112, 122 should be migrated. A VM may be identified for migration based on a detected undesirable change in any one of the previously described factors for placement of a VM at a particular candidate host. When a determination is made to migrate one of VMs 112, 122, VM migration manager 132 of host controller 130 may select one of host machines 110, 120 as a destination for receiving a migrating VM 112, 122 using, for example, the host selection algorithm discussed above. VM migration manager 132 may be configured to identify one of host machines 110, 120 to be a candidate destination host machine capable of hosting a migrating VM 112, 122. In one embodiment, the candidate destination host machine includes those host machines that can launch a VM and provide all relevant resources for the VM, such as access to relevant storage and logical networks.

As part of the migration process, VM migration manager 132 may be further configured to track I/O requests associated with one or more of VMs 112, 122 selected for migration, and generate one or more corresponding data records comprising a listing of tracked I/O requests undergoing or queued for processing in connection with the one or more VMs 112, 122 selected for migration. The one or more data records comprising the listing of tracked I/O requests may identify the completion status for each of the tracked I/O requests. The one or more data records may be stored, for example, on a shared storage device (not shown) managed by storage manager 134 to provide access to the listing of tracked I/O requests and their corresponding completion status by any one of host machines 110, 120 selected as the candidate destination host machine.

I/O requests associated with VMs 112, 122 may be initiated by their corresponding hypervisors 114, 124, emulating I/O operations for a guest OS of VMs 112, 122. Since hypervisors 114, 124 may be emulating I/O operations for more than one guest OS of VMs 112, 122, processing time and performance of host machines 110, 112 may be impacted, which in turn may restrict the time it takes to complete a migration process. I/O requests associated with a migrating VM 112, 122 may be processed on an origin host machine from which the selected VM is being migrated. When there is a large number of I/O requests being processed or in a queue to be processed, the origin host machine may carry an unnecessarily large processing load. Additionally, resuming operations of a migrated VM at a destination host machine may be halted until processing of I/O requests for the migrated VM are completed on the origin host machine. Thus, host machines 110, 112 would benefit from the management of I/O requests when migrating VMs 112, 122.

By configuring migration manager 132 to track I/O requests and storage manager 134, which may be selectively coupled to migration manager 132, to store one or more data records comprising a listing of tracked I/O requests for VMs 112, 122 selected for migration, processing of uncompleted I/O requests may be transferred from the origin host machine to the destination host machine. More specifically, embodiments of the invention track I/O requests to permit canceling of pending I/O requests at an origin host machine when one of VMs 112, 122 is migrated to a destination host machine. The one or more data records comprising the listing of tracked I/O requests may then be retrieved by, or transmitted to, the destination host machine to determine the completion status of the I/O requests canceled at the origin host machine and resume processing of the same at the destination host machine.

Figure 2:
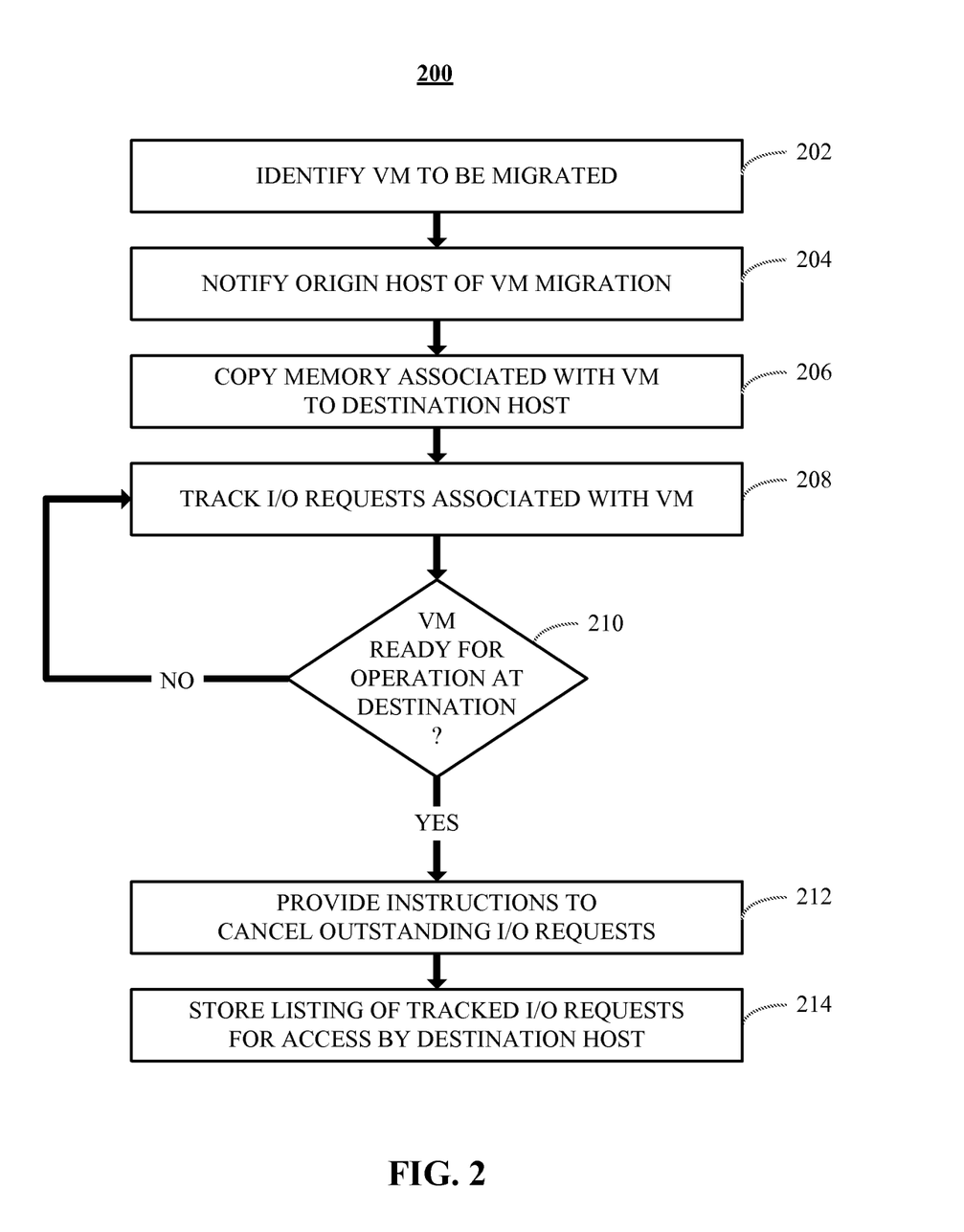
FIG. 2 is a flow diagram illustrating an embodiment of a method for tracking I/O requests associated with a virtual machine undergoing migration from an origin host machine to a destination host machine.

FIG. 2 is a flow diagram illustrating a method 200 for tracking I/O requests associated with a migrating VM, according to an embodiment of the invention. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by VM migration manager 132 of host controller 130, as illustrated in FIG. 1.

Referring to FIG. 2, method 200 may be initiated when VM migration manager 132 identifies (block 202) a VM to be migrated to a destination host machine. The identification process may further comprise transmitting a notification (block 204) to an origin host machine in which the VM currently resides, the notification informing the origin host machine to permit VM migration manager 132 access to memory associated with the resident VM selected to be migrated for purposes of copying (block 206) its corresponding memory (e.g., CPU registers, device states, etc.) to the destination host machine.

Once the origin host machine has been notified of the VM selected to undergo migration to a destination host machine, VM migration manager 132 may initiate tracking (block 208) of I/O requests being processed by the hypervisor emulating the I/O operations for the guest OS of the migrating VM. In one embodiment, tracking of I/O requests may be enabled at the point when the origin host machine is notified of the VM migration. In another embodiment, tracking of I/O requests may be enabled after memory associated with the VM begins to be copied for migrating to the destination host machine. In yet another embodiment, tracking of I/O requests may be enabled after copying of certain sections of memory, deemed non-critical to the processing of I/O requests at the origin host machine, is substantially complete.

Tracking of I/O requests may be continued until a determination is made (block 210) that the migrating VM is ready for operation at the destination host machine. When an affirmative determination is made that the migrating VM is ready for operation at the destination host machine, the origin host machine may receive instructions to cancel (block 212) pending I/O requests undergoing or queued for processing. For example, VM migration manager 132 may generate and transmit a notification to the operating system of the origin host machine instructing the hypervisor emulating I/O operations to cancel all I/O requests associated with the migrating VM.

A listing of the tracked I/O requests and their corresponding completion status may be stored (block 214) for accessibility by the destination host machine. For example, hypervisors 114, 124 may be communicatively coupled to storage manager 134 to pass one or more data records comprising a listing of tracked I/O requests for the migrated VM to a storage device configured for sharing between origin and destination host machines. In another example, a listing of tracked I/O requests may be transferred, over network 150, directly between origin and destination host machines. In one embodiment, the one or more data records comprising the listing of tracked I/O requests for the migrated VM may also provide information relating to any requirements associated with the order in which the tracked I/O requests should be processed. The VM migration manager may then inform the destination host machine about the listing of tracked I/O requests for the migrated VM. For example, if the listing is stored as a file, the VM migration manager may notify the destination host machine about the location of the file.

Figure 3:
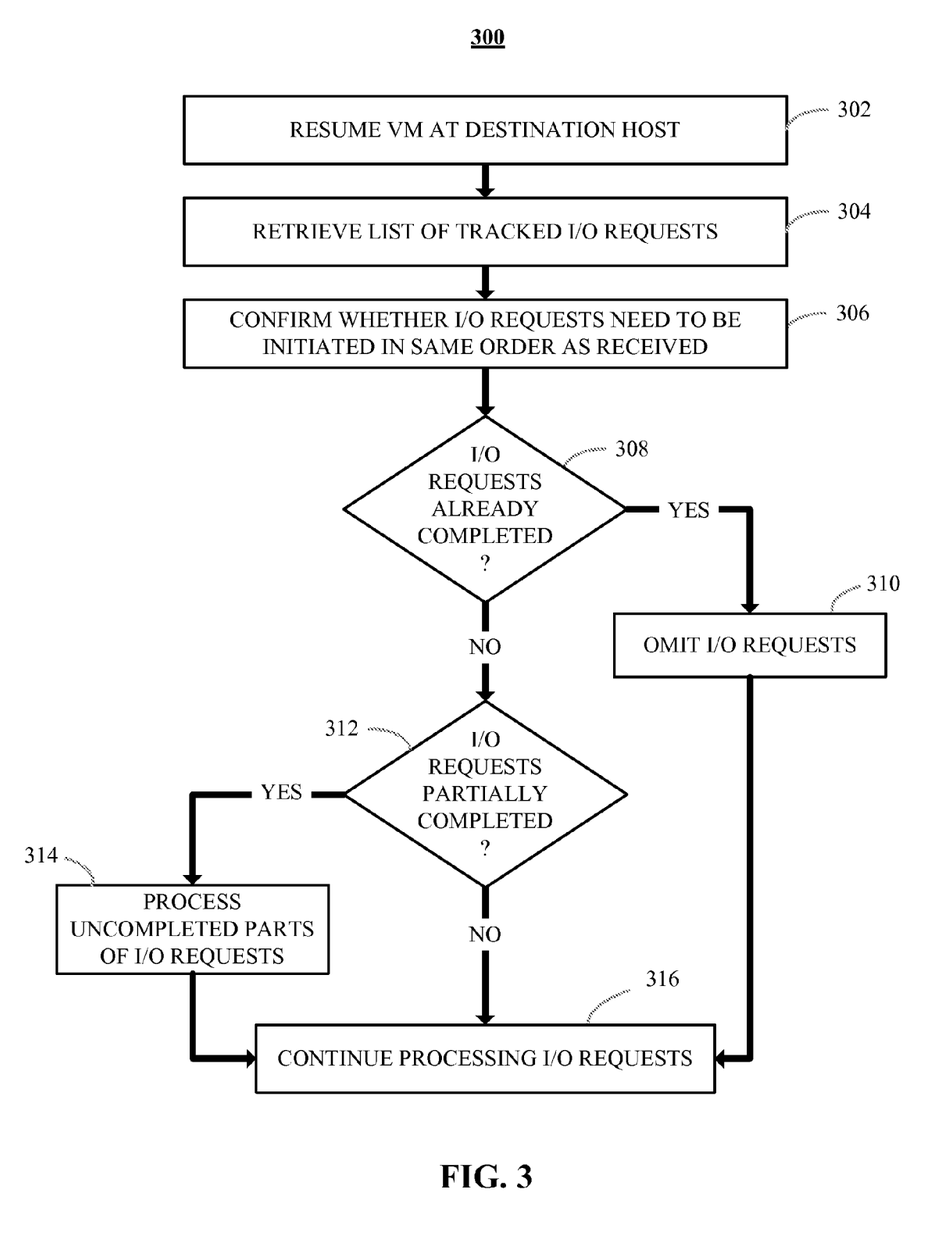
FIG. 3 is a flow diagram illustrating an embodiment of a method for handling tracked I/O requests associated with a migrated virtual machine at a destination host machine.

FIG. 3 is a flow diagram illustrating a method 300 for handling tracked I/O requests associated with a migrated virtual machine at a destination host machine, according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 may be performed by a hypervisor of the destination host machine.

Referring to FIG. 3, method 300 may be initiated upon resuming operations (block 302) of the migrated VM at the destination host machine and/or upon receiving a notification about the listing of tracked I/O requests for the migrated VM. The one or more data records comprising the listing of tracked I/O requests associated with the migrated VM may be retrieved (block 304) for processing tracked I/O requests initiated at the origin host machine prior to completion of the migration to the destination host machine. For example, the destination host machine may be configured to retrieve the one or more data records from a shared storage device managed, for example, by storage manager 134.

Upon retrieving the one or more data records comprising the listing of tracked I/O requests associated with the migrated VM, a hypervisor residing on the destination host machine may confirm (block 306) whether the listing of tracked I/O requests need to be initiated for processing in any particular order. In one embodiment, instructions may be directed at a particular processing order for some or all of the tracked I/O requests associated with the migrated VM. Once the order for initiating the tracked I/O requests, if any, is confirmed, a series of determinations may be made to properly and efficiently process the tracked I/O requests associated with the migrated VM resuming operations on the destination host machine.

In one embodiment, method 300 may comprise at least two determinations. A first determination may be made (block 308) for assessing whether any of the tracked I/O requests in the retrieved listing were completed prior to resuming operations of the migrated VM at the destination host machine. If it is determined that one or more of the tracked I/O requests in the retrieved listing has already been completed, those requests may be omitted (block 310) without being initiated by the hypervisor at the destination host machine.

Thereafter, a second determination may be made (block 312) for assessing whether any of the tracked I/O requests remaining in the retrieved listing were partially completed. If it is determined that one or more of the tracked I/O requests in the retrieved listing has been partially completed, the uncompleted parts may be processed (block 314) via the hypervisor of the destination host machine. For example, with a data write request of length 2 MB at offset 0, only the first 1 MB of the data write request may have been completed. In this example, the destination hypervisor may initiate the data write request for the remaining 1 MB. If it was previously confirmed (block 306) that the tracked I/O requests needed to be initiated for processing in a particular order, the partially completed I/O requests may then be processed in the prescribed order. Referring to the previous example, if additionally, a read request was initiated, and was canceled, on the origin hypervisor, this read request would need to be processed after the partial write request. After the determinations have been made, and the corresponding appropriate actions taken, the migrated VM operating on the destination host machine may continue processing (block 316) all remaining and newly generated I/O requests.

It should be noted that the sequence of operations of methods 200 and 300 may be different from that illustrated in FIGS. 2 and 3. For example, the operations of block 304 and 306 may be executed before the operation of block 302, etc.

Figure 4:
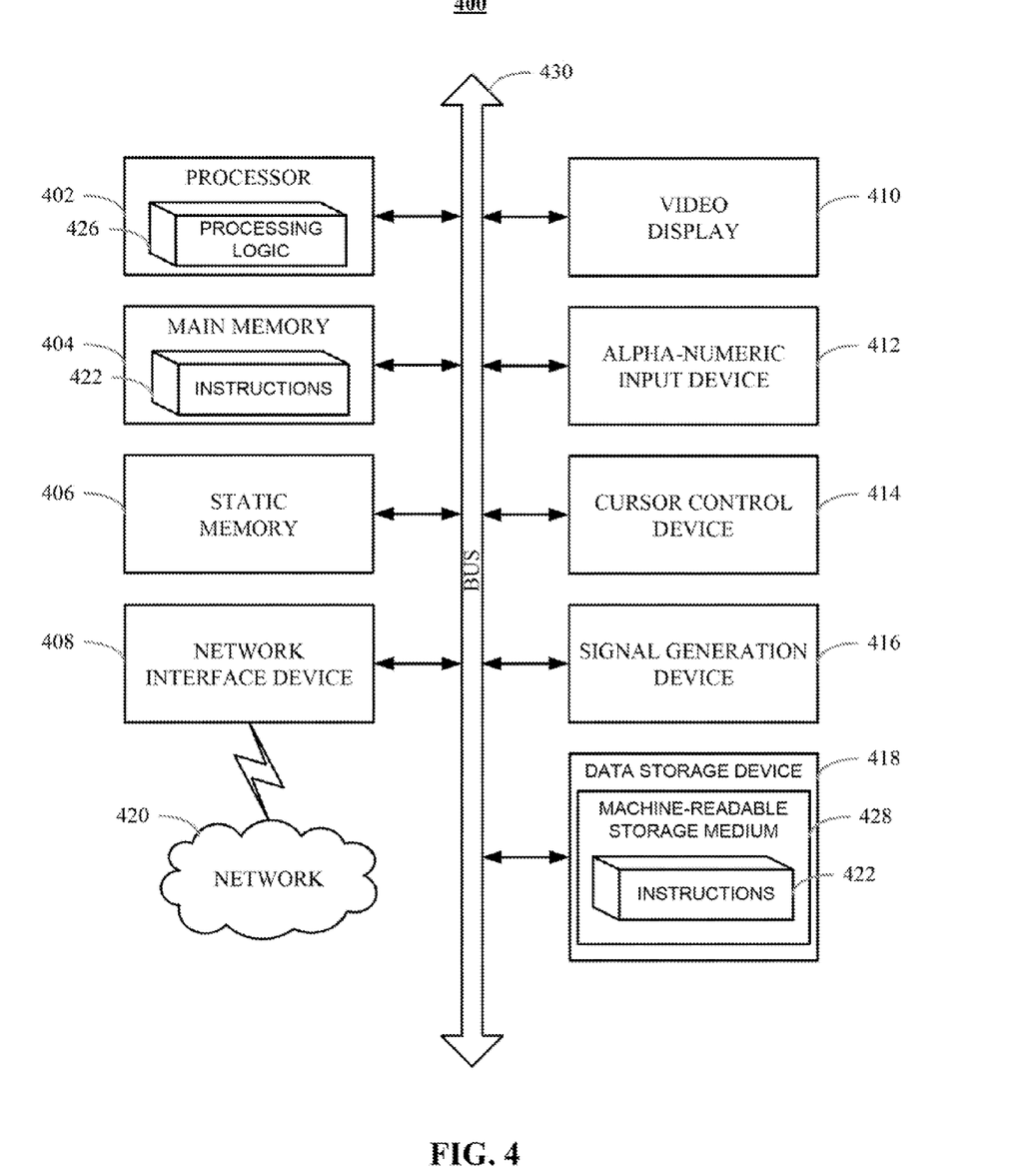
FIG. 4 illustrates a diagrammatic representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute processing logic 426 for performing the operations and steps discussed herein.

Computer system 400 may further include a network interface device 408. Computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

Data storage device 418 may include a machine-readable storage medium (or more specifically a computer-readable storage medium) 428 having one or more sets of instructions (e.g., software 422) embodying any one or more of the methodologies of functions described herein. For example, software 422 may store instructions to manage processing of I/O requests during VM migration. Software 422 may also reside, completely or at least partially, within main memory 404 and/or within processing device 402 during execution thereof by computer system 400; main memory 404 and processing device 402 also constituting machine-readable storage media. Software 422 may further be transmitted or received over a network 420 via network interface device 408.

Machine-readable storage medium 428 may also be used to store instructions to manage processing of I/O requests during VM migration. While machine-readable storage medium 428 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
   identifying, by a processing device, a virtual machine among a plurality of virtual machines executing on an origin host machine for migration;
   selecting, by the processing device, a destination host machine among a plurality of destination host machines to receive the virtual machine for migration, wherein a status of each of the destination host machines and a status of each of the plurality of virtual machines are used to determine the selection of the destination host machine;

cancelling, by the processing device, requests being processed by the virtual machine on the origin host machine;

determining, by the processing device, a completion status for each of the cancelled requests on the origin host machine, wherein the completion status for each of the cancelled requests indicates completed and uncompleted parts of a request at the time it was cancelled; and causing, by the processing device, the cancelled requests and the completion status for each of the cancelled requests to become accessible by the selected destination host machine.

2. The method of claim 1, wherein the requests are cancelled by a hypervisor on the origin host machine.

3. The method of claim 1, wherein the cancelled requests are processed on the destination host machine.

4. The method of claim 1, wherein a listing of the requests is stored in a shared memory device accessible by the destination host machine, wherein the requests are input/output requests.

5. A method comprising:

selecting, by a processing device, a destination host machine among a plurality of destination host machines to receive a virtual machine for migration, wherein a status of each of the destination host machines and a status of the virtual machine are used to determine the selection of the destination host machine;

migrating by the processing device, the virtual machine from an origin host machine to the selected destination host;

retrieving, by the processing device, a data record comprising a listing of tracked requests for the migrated virtual machine and a completion status for each of the tracked requests in the listing of the tracked requests, the data record generated during the migration of the virtual machine, and the completion status for each of the tracked requests indicating completed and uncompleted parts of the request;

for each of the tracked request in the listing of tracked requests:

analyzing, by the processing device, the completion status of the tracked request to determine whether the tracked request was fully completed at the origin host machine;

processing, by the processing, device, the uncompleted parts of the tracked request on the selected destination host machine when it is determined that the tracked request was not fully completed at the origin host machine; and omitting, by the processing device, the tracked request from processing by the selected destination host machine when it is determined that the tracked request was fully completed at the origin host machine.

6. The method of claim 5, wherein the data record comprising the listing of tracked requests is retrieved from a shared storage device, herein the requests are input/output requests.

7. The method of claim 5, wherein the tracked requests are received for processing by a hypervisor on the destination host machine.

8. The method of claim 5, further comprising confirming whether the tracked requests in the listing are to be processed in a particular order.

9. A system, comprising:

a memory;

a processing device, communicatively coupled to the memory, to:

select a destination host machine among a plurality of destination host machines to receive a virtual machine for migration, wherein a status of each of the destination host machines and a status of the virtual machine are used to determine the selection of the destination host machine;

migrate virtual machine from an origin host machine to the selected destination host;

retrieve a data record comprising a listing of tracked requests for the migrated virtual machine and a completion status for each of the tracked requests in the listing of the tracked requests, the data record generated during the migration of the virtual machine, and the completion status for each of the tracked reuuests indicating completed and uncompleted parts of the request;

for each of the tracked requests in the listing of tracked requests:

analyze the completion status of the tracked request to determine whether the tracked request was fully completed at the origin host machine;

process the uncompleted parts of the tracked request on the selected destination host machine when it is determined that the tracked request was not fully completed at the origin host machine; and omit the tracked request from processing by the selected destination host machine when it is determined that the tracked request was fully completed at the origin host machine.

10. The system of claim 9, Wherein the data record comprising the listing of tracked requests is retrieved from a shared storage device, wherein the requests are input/output requests.

11. The system of claim 9, wherein the tracked requests are received for processing by a hypervisor on the destination host machine.

12. The system of claim 9, the processing device to confirm whether the tracked requests in the listing, are to be processed in a particular order.

13. A non-transitory computer-readable storage medium comprising instructions that, when executed by a processing, device, cause the processing device to:

select a destination host machine among a plurality of destination host machines to receive a virtual machine for migration, wherein a status of each of the destination host machines and a status of the virtual machine are used to determine the selection of the destination host machine;

migrate virtual machine from an origin host machine to the selected destination host;

retrieve a data record comprising a listing of tracked requests for the migrated virtual machine and a completion status for each of the tracked requests in the listing of the tracked requests, the data record generated during the migration of the virtual machine, and the completion status for each of the tracked requests indicating completed and uncompleted parts of the request;

for each of the tracked requests in the listing of tracked requests:

analyze the completion status of the tracked request to determine whether the tracked request was fully completed at the origin host machine;

process the uncompleted parts of the tracked request on the selected destination host machine when it is determined that the tracked request was not fully completed at the origin host machine; and omit the tracked request from processing by the selected destination host machine when it is determined that the tracked request was fully completed at the origin host machine.

14. The nova-transitory computer-readable storage medium of claim 13, wherein the data record comprising the listing of tracked requests is retrieved from a shared storage device, wherein the requests are inputioutput requests.

15. The non-transitory computer-readable storage medium of claim 13, wherein the tracked requests are received for processing by a hypervisor on the destination host machine.

16. The non-transitory computer-readable storage medium of claim 13, the processor is further to confirm whether the tracked requests in the listing are to be processed in a particular order.

* * * * *